United States Patent
Wang et al.

(10) Patent No.: US 12,404,770 B2
(45) Date of Patent: Sep. 2, 2025

(54) RIGHT-ANGLE TURNING METHOD FOR SMALL-DIAMETER TBM EXPLORATION ADIT EXCAVATION

(71) Applicant: PowerChina Northwest Engineering Corporation Limited, Xi'an (CN)

(72) Inventors: Youlin Wang, Xi'an (CN); Yongshun Liu, Xi'an (CN); Junheng Cao, Xi'an (CN); Jian Jiao, Xi'an (CN); Shuwu Li, Xi'an (CN); Xiaoliang He, Xi'an (CN); Jian Bao, Xi'an (CN); Yue Zhao, Xi'an (CN); Zhongqiang Zhao, Xi'an (CN); Xiaoxia Xu, Xi'an (CN); Lei Feng, Xi'an (CN); Nan Chen, Xi'an (CN); Wei Liu, Xi'an (CN); Zhixiang Zhao, Xi'an (CN)

(73) Assignee: PowerChina Northwest Engineering Corporation Limited, Xi'an (CN)

( * ) Notice: Subject to any disclaimer, the term of this patent is extended or adjusted under 35 U.S.C. 154(b) by 361 days.

(21) Appl. No.: 18/097,876

(22) Filed: Jan. 17, 2023

(65) Prior Publication Data
US 2024/0151143 A1    May 9, 2024

(30) Foreign Application Priority Data
Nov. 4, 2022    (CN) .......................... 202211380634.5

(51) Int. Cl.
*E21D 9/10*    (2006.01)
*E21D 9/00*    (2006.01)

(52) U.S. Cl.
CPC ........... *E21D 9/008* (2016.01); *E21D 9/1093* (2013.01); *E21D 9/10* (2013.01)

(58) Field of Classification Search
CPC .......... E21D 9/10; E21D 9/008; E21D 9/1093
See application file for complete search history.

(56) References Cited

FOREIGN PATENT DOCUMENTS

JP    2002106289    *    4/2002

* cited by examiner

Primary Examiner — Sunil Singh
(74) Attorney, Agent, or Firm — Hawaii Patent Services; Nathaniel K. Fedde; Kenton N. Fedde

(57) ABSTRACT

The present invention discloses a right-angle turning method for small-diameter TBM exploration adit excavation and belongs to the field of geological exploration of water conservancy and hydropower projects. The method includes the steps: excavating a main exploration adit with a small-diameter TBM to a designated position, and then enabling the small-diameter TBM to continue to excavate forward to a temporary parking place, and parking the small-diameter TBM there; expanding and excavating a turning workspace at a right-angle turning position, and assembling a rotary platform; pulling the TBM onto the rotary platform, then starting excavation after rotating the rotary platform to make the TBM move in a same direction as the branch exploration adit; and pulling the TBM onto the rotary platform after excavation of the branch exploration adit is completed, and then moving the TBM to an adit portal so as to complete excavation after rotating the rotary platform to make the TBM move in a same direction as the main exploration adit. The present invention effectively solves the problems that the small-diameter TBM can only excavate main exploration adits in geological exploration adits of underground powerhouses of hydropower projects and pumped storage projects, and cannot make right-angle turns and excavate branch adits of underground cavern groups. It effectively fills the blank of a traditional adit excavation adopting blasting technology; and the excavation efficiency is high, the working environment is friendly, and safety production is guaranteed.

4 Claims, 1 Drawing Sheet

RIGHT-ANGLE TURNING METHOD FOR SMALL-DIAMETER TBM EXPLORATION ADIT EXCAVATION

TECHNICAL FIELD

The present invention relates to the technical field of energy exploration, in particular to a right-angle turning method for small-diameter TBM exploration adit excavation.

BACKGROUND

A small-diameter TBM rock tunnel boring machine refers to geological exploration adit excavation equipment with the cutter head diameter less than 3.5 m, which integrates optical, mechanical, electrical, hydraulic, sensing and information technologies. It has the functions such as surrounding rock grinding and excavating, automatic transportation of ballast, real-time combined bolting and shotcrete, guidance measure deviation correction, and automatic remote operation. It is also called the "sharp tool" of modern small-section underground cavern construction.

With the implementation of the national "carbon peaking and carbon neutrality" goals, there is a huge demand for energy development and construction such as hydropower projects and pumped storage projects. Since these large-scale projects are located in deep mountains and valleys in the western region, all-phase of survey and design of many projects is required to be completed within one year. The excavation efficiency of exploration adits of underground powerhouses is a key factor restricting the progress of the exploration design. According to the needs of projects, the adit depth is generally 500-1500 m; while the construction period is short, and tasks are hard. It is difficult to achieve safe construction of ultra deep and ultra long adits with conventional borehole-blasting methods, especially in areas of Xinjiang and Tibet, where strict control of pyrotechnical materials brings an insurmountable bottleneck to normal geological exploration. In order to ensure the normal exploration progress of hydropower projects and pumped storage projects, adapt to the harsh environmental conditions such as mountains and valleys, high, cold areas and high altitude, adapt to local conditions and be environmentally friendly, the application of small-diameter TBM in the early-phase geological exploration adits came into being.

The exploration adits of the underground powerhouses of hydropower and pumped storage projects are arranged in an axial direction of an underground cavern group. Firstly, a main exploration adit is constructed from a tailrace to the powerhouse; and then when construction reaches the underground powerhouse group (a main powerhouse, a main transformer chamber and a tailgate chamber), branch exploration adits shall be constructed along the axis of the underground powerhouse, and a direction is generally perpendicular to the main exploration adit. Small-radius turning can be achieved during conventional small-diameter TBM excavation, but there is no report on the technical content of right-angle turning. After the excavation of the main tunnel is completed, right-angle turning cannot be achieved for construction of the exploration adits, which is a technical bottleneck in the construction of the powerhouse exploration adits. Therefore, how to provide an adit excavation right-angle turning method with a small-diameter TBM to solve practical problems in geological exploration is a problem that needs to be solved by technicians in this field for generations.

SUMMARY

In view of this, the present invention aims to solve the technical problem that a small-diameter TBM cannot make right-angle turns during the excavation of exploration adits of underground powerhouses in hydropower projects and pumped storage projects, resulting in the failure of exploration of underground cavern group branch adits, and providing a right-angle turning method for small-diameter TBM exploration adit excavation.

A small-diameter tunnel boring machine (TBM) adopted by the present invention has a total length of about 27 m, and mainly includes a host system, a control system, a cooling system, a slag removal system and other parts. The systems are separated and freely connected and rotated. The length of each part is about 6-7 m, and the machine has the function of right-angle turning.

In order to achieve the above objective, the present invention provides the following technical solutions:
a right-angle turning method for small-diameter TBM exploration adit excavation includes the following steps:
(1) according to a pre-designed direction and depth of a main exploration adit, adopting the small-diameter TBM for construction and excavation to a designated position, and then enabling the small-diameter TBM to continue to drive forward to a temporary parking place, and parking the small-diameter TBM there;
(2) expanding and excavating a turning workspace at the right-angle turning position where a branch exploration adit is perpendicular to the main exploration adit, and assembling a rotary platform in the turning workspace;
(3) retracting the small-diameter TBM and pulling the machine onto the rotary platform, rotating the rotary platform to make the small-diameter TBM move in a same direction as the branch exploration adit, and driving the machine to excavate the branch exploration adit to a design depth; and
(4) retracting the small-diameter TBM and pulling the machine onto the rotary platform after excavation of the branch exploration adit is completed, rotating the rotary platform to make the small-diameter TBM move in a same direction as the main exploration adit, and then moving the machine to an adit portal so as to complete excavation.

Preferably, a distance between the side walls of the turning workspace described in step (2) and the small-diameter TBM is greater than or equal to 2 m.

Preferably, the bottom of the turning workspace is dug down, so that the top surface of the rotary platform is at the same level with the main exploration adit.

Preferably, the rotary platform is installed on the bottom surface of the turning workspace with horizontal bearings.

Preferably, horizontal jacks are installed on both sides of the rotary platform, and the other end of each horizontal jack abuts against the turning workspace.

Preferably, the rotary platform is made of a steel plate or a concrete precast slab, and the top surface is equipped with a support mechanism and a thrust mechanism which are connected with the small-diameter TBM.

Further, the support mechanism includes a tail support perpendicular to the rotary platform, a beam, of which the two ends are respectively connected with the small-diameter TBM and the top end of the tail support, main support shoes installed on both sides of the beam, and bottom support shoes installed under the beam; and the thrust mechanism includes thrust oil cylinders, while the two ends of the thrust oil cylinders are respectively connected with the small-diameter TBM and the main support shoes.

It can be seen from the above technical solutions that, compared with the prior art, the right-angle turning method for small-diameter TBM exploration adit excavation provided by the present invention has the following beneficial effects:

the technical problem that a small-diameter TBM cannot make right-angle turns during the excavation of exploration adits of underground powerhouses in hydropower projects and pumped storage projects, resulting in the failure of exploration of underground cavern group branch adits. The application of the small-diameter TBM in the construction of the exploration adits for the underground caverns of the hydropower projects and the pumped storage projects can effectively solve the problems of a traditional borehole-blasting method, such as difficult approval of blasting materials, high storage safety risks, high occupational health and safety risks during construction, slow construction progress, and prominent environmental protection problems. Therefore, the small-diameter TBM can greatly improve the exploration adit excavation efficiency and the labor productivity, lowers construction safety risks, is environmentally friendly, creates a good working environment, embodies the concepts of green, energy-saving and environmental protection survey, and leads the technological progress of the industry.

BRIEF DESCRIPTION OF THE DRAWINGS

In order to more clearly describe the embodiments of the present invention or the technical solutions in the prior art, the accompanying drawings that need to be used in the embodiments or the description of the prior art are briefly introduced below. Apparently, the accompanying drawings in the following description are only embodiments of the present invention. For those of ordinary skill in the art, other accompanying drawings can be obtained based on these accompanying drawings without creative work.

wherein: 1—main exploration adit excavation direction, 2—turning workspace, 3—temporary parking place, 4—branch exploration adit excavation direction, 5—main exploration adit, 6—branch exploration adit, 7—rotary platform, 8—bearing, 9—cutter head, 10—main support shoe, 11—small-diameter TBM, 12—horizontal jack, 13—thrust oil cylinder, 14—bottom support shoe, 15—tail support, 16—beam.

DESCRIPTION OF THE EMBODIMENTS

The technical solutions of the present invention will be clearly and completely described below in conjunction with embodiments of the present invention. Apparently, the described embodiments are only part of the embodiments of the present invention, but not all of the embodiments. Based on the described embodiments of the present invention, all other embodiments obtained by those of ordinary skill in the art without creative labor fall within the scope of protection of the present invention.

Figure 1:
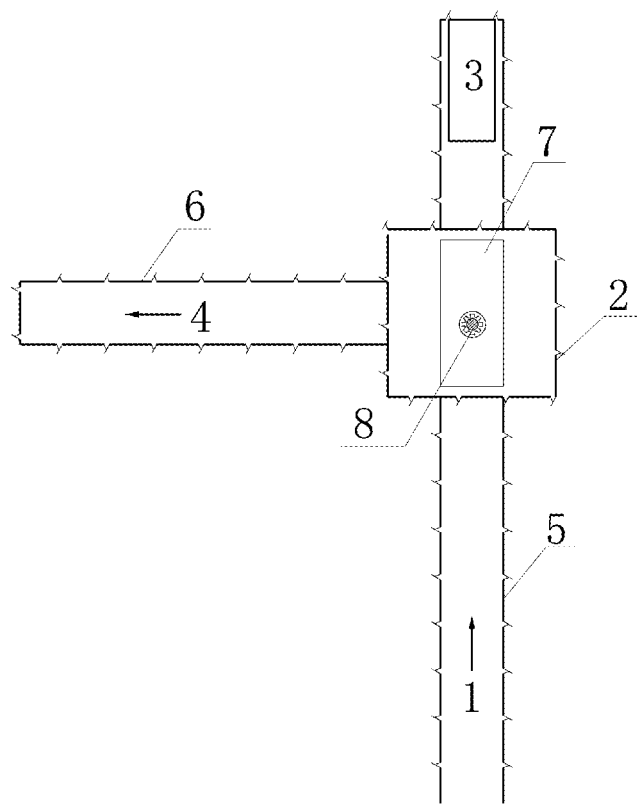
FIG. 1 is a general layout planar diagram of the present invention.
Figure 2:
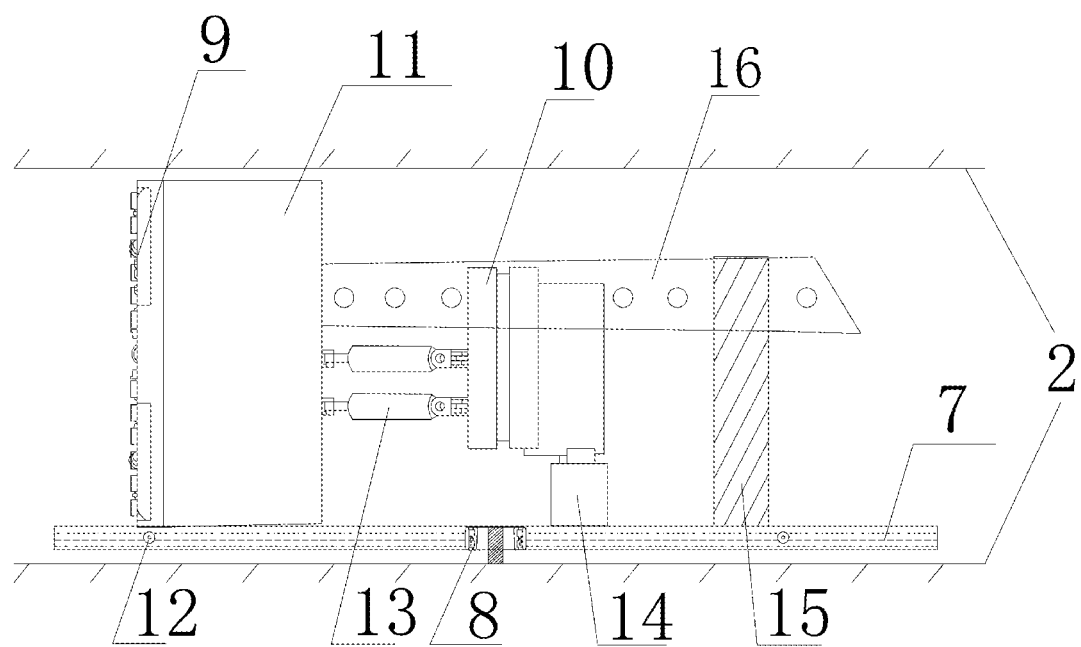
FIG. 2 is a sectional diagram of a right-angle turning system of the present invention.

As shown in FIGS. 1 and 2, a right-angle turning method for small-diameter tunnel boring machine (TBM) exploration adit excavation includes the following steps:

(1) According to pre-designed excavation direction 1 and depth of a main exploration adit, adopting a small-diameter TBM for construction and excavation to a designated position, and then enabling the small-diameter TBM to continue to drive forward to a temporary parking place 3, and parking the small-diameter TBM there.

(2) Expanding and excavating a turning workspace 2 at the right-angle turning position where a branch exploration adit 6 is perpendicular to the main exploration adit 5, wherein the side length of the turning workspace 2 is no less than 2 m longer than the length of the main machine to meet turning and other working requirements of the main machine; and excavating the bottom of the turning workspace 2 for 0.3 m, expanding and excavating the top for 0.1 m. As shown in FIG. 2, horizontal bearings 8 are installed in the center of the bottom excavation position, then a rotary platform 7 is installed on the horizontal bearings 8, horizontal jacks 12 are installed on both sides of the rotary platform 7, and components of a support mechanism and a thrust mechanism are installed on the rotary platform 7, wherein the support mechanism includes a tail support 15 perpendicular to the rotary platform 7, a beam 16, of which the two ends are respectively connected with the small-diameter TBM 11 and the top end of the tail support 15, main support shoes 10 installed on both sides of the beam 16, and bottom support shoes 14 installed under the beam 16; and the thrust mechanism includes thrust oil cylinders 13, while the two ends of the thrust oil cylinders 13 are respectively connected with the small-diameter TBM 11 and the main support shoes 10.

(3) Providing reaction force through the main support shoes 10, the bottom support shoe 14 and the tail support 15, retracting the small-diameter TBM 11 onto the rotary platform 7 with power provided by the thrust oil cylinders 13, starting the hydraulic horizontal jacks 12 on both sides to rotate the rotary platform 7 by 90° so as to make the small-diameter TBM 11 move in a same direction as the branch exploration adit 6, and driving to the branch exploration adit 6 to the design depth after reviewing the excavation direction 4 of the branch exploration adit with a surveying and mapping instrument.

(4) Providing reaction force through the main support shoes 10, the bottom support shoe 14 and the tail support 15 after excavation of the branch exploration adit 6 is completed, retracting the small-diameter TBM 11 onto the rotary platform 7 with power provided by the thrust oil cylinders 13, starting the hydraulic horizontal jacks 12 on both sides to rotate the rotary platform 7 by 90° so as to make the small-diameter TBM 11 move in a same direction as the main exploration adit 5, enabling the small-diameter TBM 11 to make stepping forward or reversing to exit to an adit portal, and then completing the excavation.

Specific embodiments are adopted for description below:

Embodiment 1

Small-diameter TBM excavation construction of underground powerhouse group adits of a certain hydropower station:

(1) The underground powerhouse of the certain hydropower station was arranged on the left bank of a river, and an exploration adit was arranged in a shape of an Arabic numeral "7"; wherein a main exploration adit 5 was excavated along the river to the underground powerhouse group, an excavation direction 1 of the main exploration adit was NE60°, and the design excavation length of the main adit was 400 m; the branch exploration adit 6 was arranged along the axis of the main powerhouse, the branch exploration adit 6 was perpendicular to an axis direction of the main exploration adit 5, an excavation direction of the branch exploration adit 6 was NW330°, and the excavation length was 270 m; a "7"-shaped intersection of the main exploration adit 5 and the branch exploration adit 6 was the predetermined turning workspace 2; the diameter of the adopted small-diameter TBM 11 this time was 2.8 m, and the main machine was 6 m long; and after the main exploration adit 5 was excavated to the adit intersection with the small-diameter TBM 11, the small-diameter TBM continued to advance to a temporary parking place 3 for the small-diameter TBM 11, and the excavation length of the temporary parking place 3 was 15 m, which met the requirements for temporary parking of the main machine and auxiliary systems and expansion of the adit at the intersection.

(2) After the small-diameter TBM 11 was driven to the temporary parking place 3, a rock splitter was used to expand and excavate the turning workspace 2 at the intersection of the main exploration adit 5 and the branch exploration adit 6, and the turning workspace 2 was expanded and excavated into a planar square, wherein the side length was no less than 2 m longer than the length of the main machine so as to meet the requirements of right-angle turning of the main machine, a working distance on both sides, and next starting; the space was expanded by 8 m, the bottom of the adit was excavated by 0.3 m for installation of a rotary platform 7, and the top was expanded by 0.1 m to create a rotation space; horizontal bearings 8 were installed in the center of the bottom excavation place, the rotary platform 7 was installed on the horizontal bearings 8, while the rotary platform 7 was rectangular, 7 m long (the rotating diameter was 7.6 m, and 0.2 m working spaces were reserved on both sides), and 3 m wide; and horizontal jacks 12 were mounted on both sides of the rotary platform 7, and components of a support mechanism and a thrust mechanism were mounted on the rotary platform 7, wherein the support mechanism includes a tail support 15 perpendicular to the rotary platform 7, a beam 16, of which the two ends are respectively connected with the small-diameter TBM 11 and the top end of the tail support 15, main support shoes 10 installed on both sides of the beam 16, and bottom support shoes 14 installed under the beam 16; and the thrust mechanism includes thrust oil cylinders 13, while the two ends of the thrust oil cylinders 13 are respectively connected with the small-diameter TBM 11 and the main support shoes 10.

(3) Reaction force was provided through the main support shoes 10, the bottom support shoe 14 and the tail support 15, the small-diameter TBM 11 was retracted onto the rotary platform 7 with power provided by the thrust oil cylinders 13, the hydraulic horizontal jacks 12 on both sides started to rotate the rotary platform 7 by 90° so as to make the small-diameter TBM 11 move in a same direction as the branch exploration adit 6, the excavation direction was NW330°, and the small-diameter TBM 11 started again to construct and excavate the branch exploration adit 6 by 270 m to the design depth after the excavation direction 4 of the branch exploration adit was reviewed with a surveying and mapping instrument.

(4) Reaction force was provided through the main support shoes 10, the bottom support shoe 14 and the tail support 15 after excavation of the branch exploration adit 6 was completed, the small-diameter TBM 11 was retracted onto the rotary platform 7 with power provided by the thrust oil cylinders 13, the hydraulic horizontal jacks 12 on both sides started to rotate the rotary platform 7 by 90° so as to make the small-diameter TBM 11 move in a same direction as the main exploration adit 5, a direction of the small-diameter TBM 11 was reviewed with the surveying and mapping instrument, and a direction of the axis after rotation was NE60°; and then the small-diameter TBM was reversed to exit an adit portal to complete the excavation.

Embodiment 2

Small-diameter TBM excavation construction of underground powerhouse group adits of a certain pumped storage power station:

(1) The certain pumped storage power station hub was arranged as a central underground powerhouse, the underground powerhouse was deeply buried in a mountain, and an exploration adit was arranged in a shape of upside-down "L", wherein an exploration main adit 5 was excavated towards an underground powerhouse group along a tailrace tunnel axis, an excavation direction of the exploration main adit 1 was NE10°, and a design excavation length of the main adit was 720 m; a branch exploration adit 6 was arranged along the axis of a main powerhouse, the branch exploration adit 6 was perpendicular to the axis direction of the main exploration adit 5, an excavation direction of the branch exploration adit 6 was SE100°, and an excavation length was 245 m; and an upside-down "L"-shaped intersection of the main exploration adit 5 and the branch exploration adit 6 was a predetermined turning workspace 2; a diameter of the adopted small-diameter TBM 11 this time was 2.5 m, and the main machine was 5.5 m long; after the main exploration adit 5 was excavated to the adit intersection with the small-diameter TBM 11, the small-diameter TBM 11 continued to advance to a temporary parking place 3 for the small-diameter TBM 11, and an excavation length of the temporary parking place 3 was 13 m, which meets the requirements for temporary parking of the main machine and auxiliary systems and the expansion of the adit at the intersection.

(2) After the small-diameter TBM 11 was driven to the temporary parking place 3, a rock splitter was used to expand and excavate the turning workspace 2 at the intersection of the main exploration adit 5 and the branch exploration adit 6, the turning workspace 2 was expanded into a planar square, and the side length was no less than 2 m longer than the length of the main machine so as to meet the requirements of right-angle turning of the main machine, the working distance on both sides, and next starting; a space was expanded by 7.5 m, the bottom of the adit was excavated by 0.3 m for installation of a rotary platform 7, and the top was expanded by 0.1 m to create a rotation space; horizontal bearings 8 were installed in the center of the bottom excavation place, the rotary platform 7 was installed on the horizontal bearings 8, while the rotary platform 7 was rectangular, 6.5 m long (a rotating diameter was 7.0 m, and 0.25 m working spaces were reserved on both sides), and 2.8 m wide; and horizontal jacks 12 were mounted on both sides of the rotary platform 7, and components of a support mechanism and a thrust mechanism were installed on the rotary platform 7, wherein the support mechanism includes a tail support 15 perpendicular to the rotary platform 7, a beam 16, of which the two ends are respectively connected with the small-diameter TBM 11 and the top end of the tail support 15, main support shoes 10 installed on both sides of the beam 16, and bottom support shoes 14 installed under the beam 16; and the thrust mechanism includes thrust oil cylinders 13, while the two ends of the thrust oil cylinders 13 are respectively connected with the small-diameter TBM 11 and the main support shoes 10.

(3) Reaction force was provided through the main support shoes 10, the bottom support shoe 14 and the tail support 15, the small-diameter TBM 11 was retracted onto the rotary platform 7 with power provided by the thrust oil cylinders 13, the hydraulic horizontal jacks 12 on both sides started to rotate the rotary platform 7 by 90° so as to make the small-diameter TBM 11 move in a same direction as the branch exploration adit 6, an excavation direction was SE100°, and the small-diameter TBM 11 started again to construct the branch exploration adit 6 by 245 m to a design depth after an excavation direction 4 of the branch exploration adit was reviewed with a surveying and mapping instrument.

(4) Reaction force was provided through the main support shoes 10, the bottom support shoe 14 and the tail support 15 after excavation of the branch exploration adit 6 was completed, the small-diameter TBM 11 was retracted onto the rotary platform 7 with power provided by the thrust oil cylinders 13, the hydraulic horizontal jacks 12 on both sides started to rotate the rotary platform 7 by 90° so as to make the small-diameter TBM 11 move in a same direction as the main exploration adit 5, a direction of the small-diameter TBM 11 was reviewed with the surveying and mapping instrument, and a direction of the axis after rotation was NW280°; and then the small-diameter TBM 11 made stepping forward to exit an adit portal to complete the excavation.

The embodiments in this specification are described in a progressive manner. Each embodiment focuses on the differences from other embodiments. The same and similar parts of each embodiment can be referred to each other. For the device disclosed in the embodiments, since the device corresponds to the method disclosed in the embodiments, the description is relatively simple, and the relevant parts can be referred to the description of the method section.

The above description of the disclosed embodiments enables those skilled in the art to implement or use the present invention. Various modifications to these embodiments are apparent to those skilled in the art, and the general principles defined herein may be implemented in other embodiments without departing from the spirit or scope of the present invention. Therefore, the present invention is not intended to be limited to the embodiments shown herein, but is to be accorded the widest scope consistent with the principles and novel features disclosed herein.

What is claimed is:

1. A right-angle turning method for small-diameter tunnel boring machine TBM' exploration adit excavation, characterized by including the following steps: (1) according to a pre-designed direction and depth of a main exploration adit, adopting a small-diameter TBM for construction and excavation to a designated position, and then enabling the small-diameter TBM to continue to drive forward to a temporary parking place, and parking the small-diameter TBM there; (2) expanding and excavating a turning workspace at the right-angle turning position where a branch exploration adit is perpendicular to the main exploration adit, and assembling a rotary platform in the turning workspace; (3) retracting the small-diameter TBM and pulling the small-diameter TBM onto the rotary platform, rotating the rotary platform to make the small-diameter TBM move in a same direction as the branch exploration adit, and driving the small-diameter TBM to excavate the branch exploration adit to a the design depth; and (4) retracting the small-diameter TBM and pulling the small-diameter TBM onto the rotary platform after excavation of the branch exploration adit is completed, rotating the rotary platform to make the small-diameter TBM move in a same direction as the main exploration adit, and then moving the small-diameter TBM to an adit portal so as to complete excavation;

wherein horizontal jacks are installed on two sides of the rotary platform, and an end of each horizontal jack abuts against the turning workspace.

2. The right-angle turning method for small-diameter TBM exploration adit excavation according to claim 1, characterized in that a distance between side walls of the turning workspace described in step (2) and the small-diameter TBM is greater than or equal to 2 m.

3. The right-angle turning method for small-diameter TBM exploration adit excavation according to claim 1, characterized in that the rotary platform is installed on a bottom surface of the turning workspace with horizontal bearings.

4. The right-angle turning method for small-diameter TBM exploration adit excavation according to claim 1, characterized in that a support mechanism and a thrust mechanism are provided, wherein the support mechanism includes a tail support perpendicular to the rotary platform, a beam, of which the ends are respectively connected with the small-diameter TBM and a top end of the tail support, main support shoes installed on both sides of the beam, and bottom support shoes installed under the beam; and the thrust mechanism includes thrust oil cylinders, while the two ends of the thrust oil cylinders are respectively connected with the small-diameter TBM and the main support shoes.

* * * * *